(12) United States Patent
Sergyeyenko et al.

(10) Patent No.: US 6,612,376 B2
(45) Date of Patent: Sep. 2, 2003

(54) HINGED EDGER HOUSING IMPROVED INTERNAL DEBRIS GUARD AND LABYRINTH PERIMETER SEAL

(75) Inventors: Oleksiy P. Sergyeyenko, Brockville (CA); Jacob R. Prosper, Brockville (CA); David M. Shaver, Brockville (CA)

(73) Assignee: Black & Decker Inc., Newark, DE (US)

(*) Notice: Subject to any disclaimer, the term of this patent is extended or adjusted under 35 U.S.C. 154(b) by 46 days.

(21) Appl. No.: 09/981,053

(22) Filed: Oct. 16, 2001

(65) Prior Publication Data

US 2003/0070820 A1 Apr. 17, 2003

(51) Int. Cl.[7] ................................................ A01D 15/00
(52) U.S. Cl. .............................. 172/15; 56/17.4; 172/17
(58) Field of Search .............................. 172/13, 14, 15, 172/16, 17; 56/17.4, 17.5; D8/8; 30/292, 306, 319

(56) References Cited

U.S. PATENT DOCUMENTS

| | | |
|---|---|---|
| 3,788,049 A | 1/1974 | Ehrlich |
| 3,807,151 A | 4/1974 | Rosenthal et al. |
| 3,872,930 A | 3/1975 | Campbell |
| 4,463,544 A | 8/1984 | Carsello et al. |
| 4,478,028 A * | 10/1984 | Dawson, Jr. .................. 56/16.9 |
| 4,756,148 A * | 7/1988 | Gander et al. ............... 56/17.2 |
| 4,803,831 A * | 2/1989 | Carmine ...................... 56/16.9 |
| 4,984,417 A * | 1/1991 | Braun et al. ................. 56/11.3 |
| 5,065,567 A | 11/1991 | Wessel et al. |
| 5,301,757 A | 4/1994 | Kelley, Jr. |
| D347,011 S | 5/1994 | Baxter |
| 5,490,371 A | 2/1996 | Potucek, III |
| 6,003,611 A * | 12/1999 | Martinez ...................... 172/15 |
| D427,861 S * | 7/2000 | Cooper et al. .................. D8/8 |
| 6,116,350 A * | 9/2000 | Notaras et al. ............... 172/15 |
| 6,125,943 A * | 10/2000 | Valois ......................... 172/15 |
| 6,263,975 B1 | 7/2001 | Rosa et al. |
| 6,289,660 B1 * | 9/2001 | Martinez ..................... 56/17.4 |

* cited by examiner

Primary Examiner—Victor Batson

(57) ABSTRACT

A housing assembly for a power edger that includes a housing and a door that is coupled to the housing and movable between an open position and a closed position. When positioned in the closed position, labyrinth seal members that are formed onto the housing and the door engage one another to form a labyrinth seal that inhibits dirt and debris from being expelled from the housing assembly. The housing assembly also includes a guard for shrouding a rotating blade. The guard includes a confronting portion having a leading end and a trailing end. The confronting portion is defined by an increasing radius relative to the rotary axis of the blade.

18 Claims, 5 Drawing Sheets

HINGED EDGER HOUSING IMPROVED INTERNAL DEBRIS GUARD AND LABYRINTH PERIMETER SEAL

FIELD OF THE INVENTION

The present invention generally relates to power edgers and more particularly to a housing assembly for housing the blade member of a power edger.

BACKGROUND OF THE INVENTION

Powered edgers having a rotary blade for performing an edging operation require routine maintenance in that the rotating blade is subject to wear and must be periodically sharpened or replaced. Furthermore, debris, such as grass and dirt, tend to accumulate on the guard around the blade and must be removed in order to maintain the efficiency and effectiveness of the edger device.

Typical housing assemblies for rotary edgers include a screw-attached guard plate that must be removed from a housing in order to gain access to the blade or to remove accumulated debris. In addition to being inconvenient, these conventional housing assemblies frequently do not thoroughly seal against the housing such that dirt and debris have been known to infiltrate in an undesired manner around the guard plate.

Accordingly, there remains a need in the art for an improved housing assembly for a power edger. The improved housing assembly is preferably highly resistant to the infiltration of debris around an access door and includes a guard that is more resistant to the accumulation of debris.

SUMMARY OF THE INVENTION

In one preferred form, the present invention provides a power edger having a power source for providing a rotational output, a blade device coupled to the power source and rotating about a rotary axis in a rotational direction in response to the rotational output of the power source, and a housing assembly configured to shroud the blade device. The housing assembly includes a housing and a door. The housing is coupled to the power source and has a wall member, a first labyrinth member, and a guard. The wall member defines a blade cavity in which the blade device is rotatably mounted. The guard is configured to shroud the blade device and includes a confronting portion that at least partially surrounds the blade device as it rotates in the blade cavity. The confronting portion being defined by a radius that increases smoothly in the rotational direction from a first radius at a leading end of the confronting portion to a second, larger radius at a trailing end of the confronting portion. The first labyrinth member being coupled to the wall member and being disposed radially outwardly from the guard such that it extends around at least a portion of the blade cavity. The door is mounted to the housing and movable between an open position, which substantially clears the blade cavity, and a closed position, which closes a portion of the blade cavity. The door has a second labyrinth member that engages the first labyrinth member to form a labyrinth seal when the door is placed in the closed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
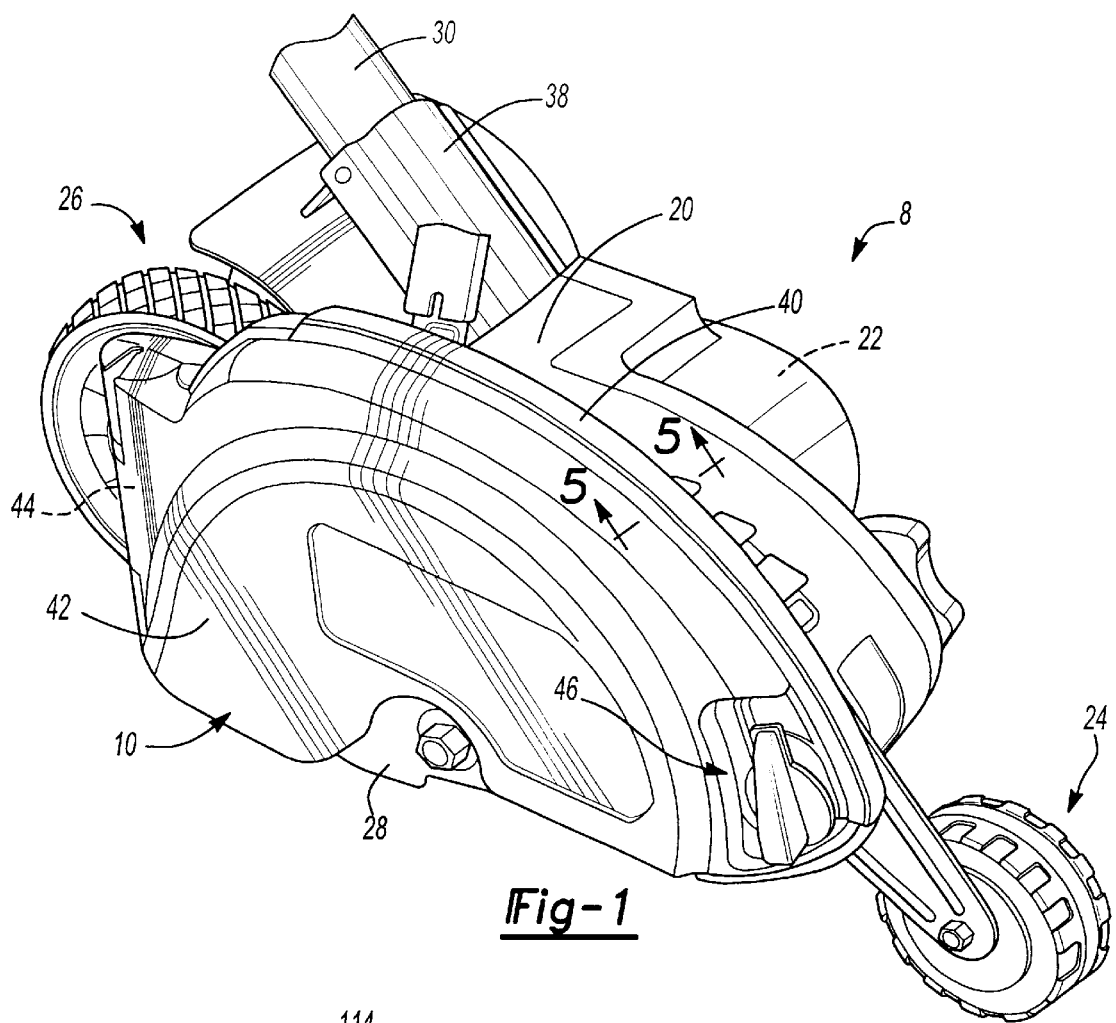
FIG. 1 is a perspective view of a power edger having a housing assembly that is constructed in accordance with the teachings of the present invention.
Figure 2:
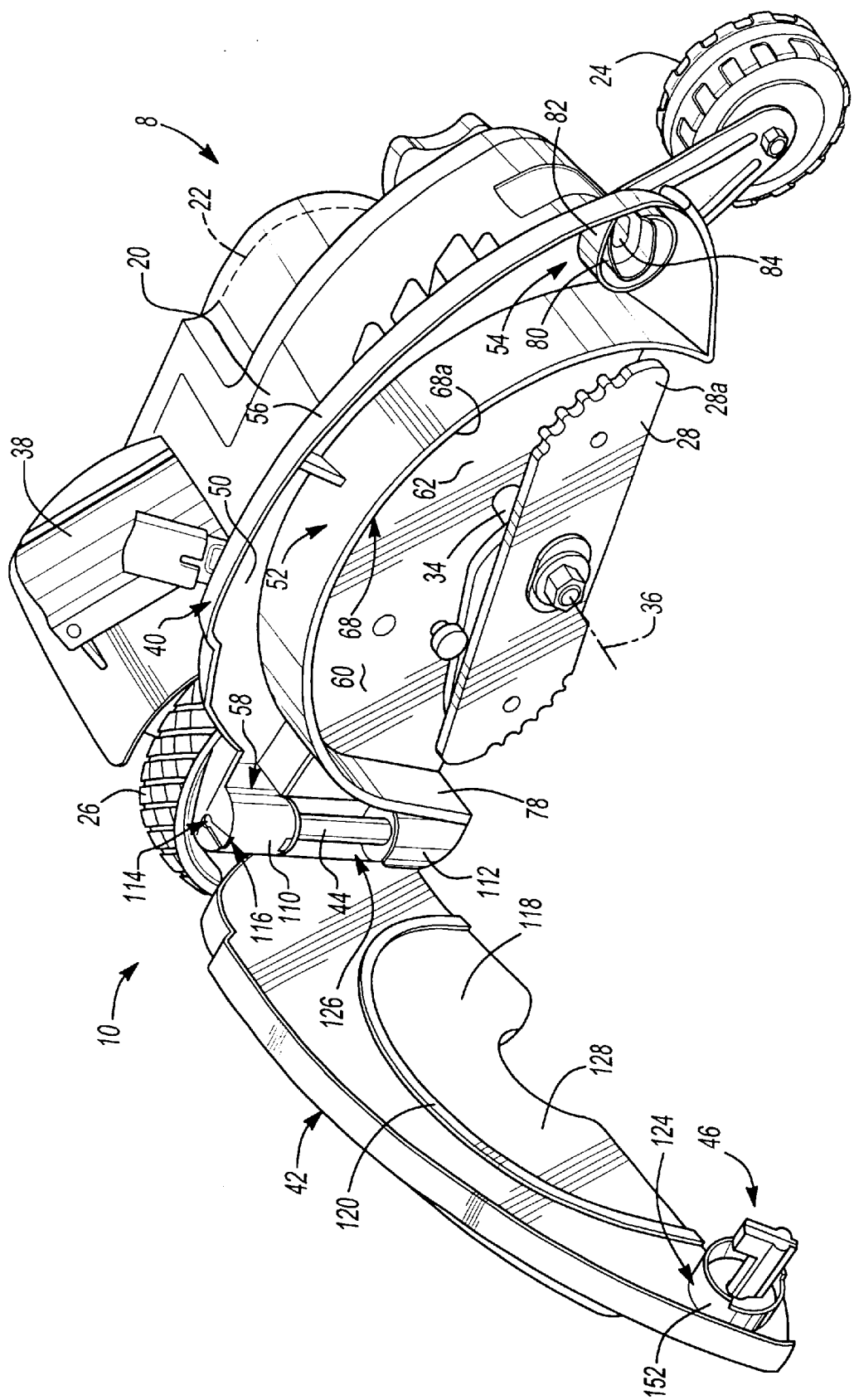
FIG. 2 is a perspective view of the power edger of FIG. 1 illustrating the door in an open condition.

With reference to FIGS. 1 and 2 of the drawings, an edger 8 is illustrated to include a housing assembly 10, which has been constructed in accordance with the teachings of the present invention. The edger 8 is also shown to include a shroud 20, a rotary power source 22, front and rear wheels 24 and 26, respectively, a blade 28 and a handle 30. The shroud 20 conventionally houses the rotary power source 22 and serves as the means by which the front and rear wheels 24 and 26 and the handle 30 are coupled to the rotary power source 22. In the particular embodiment illustrated, the shroud 20 is an integrally formed portion of the housing assembly 10, but those skilled in the art will understand that the housing assembly 10 may be discrete and separate from other portions of the edger 8, including those that house a rotary power source. The rotary power source 22 is illustrated to be an electric motor in the example provided and includes an output shaft 34 that is rotatable about a rotary axis 36. The blade 28 is fixedly but removably coupled to the output shaft 34 such that it is rotatable about the rotary axis 36. At least one of the front and rear wheels 24 and 26 is preferably movably coupled to the shroud 20 of the housing assembly 10 to permit the height of the blade 28 to be adjusted relative to the ground. The handle 30 is coupled to the shroud 20 via an attachment socket 38 that is integrally formed into the shroud 20.

Figure 3:
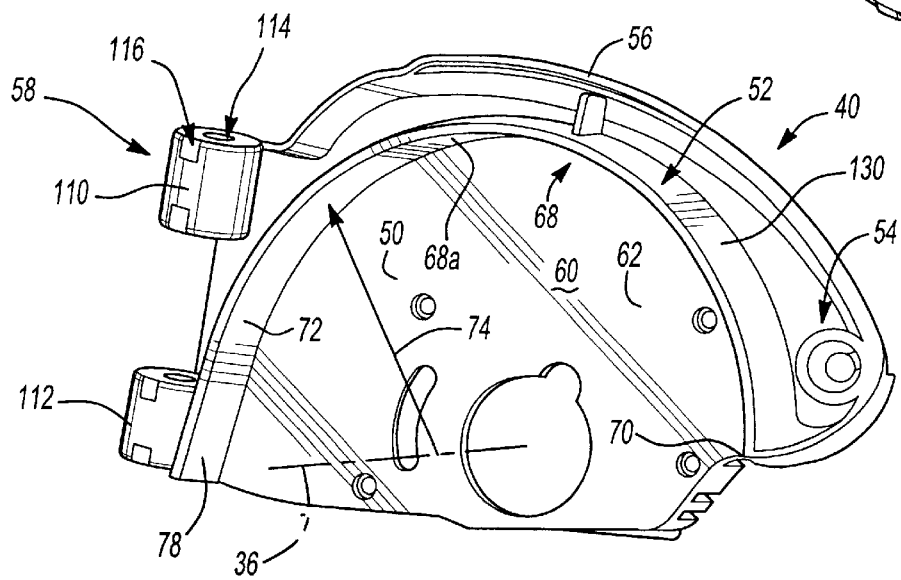
FIG. 3 is a perspective view of a portion of the power edger of FIG. 1 illustrating the housing in greater detail.

The housing assembly 10 is also illustrated to include a housing 40, a door 42, a hinge pin 44 and a latch mechanism 46. With reference to FIGS. 2 and 3, the housing 40 includes a first wall member 50, a guard 52, a latch securing structure 54, a first labyrinth member 56 and a first hinge structure 58. The housing 40 defines a blade cavity 60 in which the blade 28 is rotatably disposed and a generally vertical portion 62 that is oriented generally perpendicular the rotary axis 36 of the output shaft 34.

The guard 52 extends generally perpendicularly from the first wall member 50 in a direction that is generally parallel the rotary axis 36 such that the guard 52 bounds the outer perimeter of the blade cavity 60. The guard 52 is illustrated to include a confronting portion 68 having a leading end 70 at the forward end of the housing 40 and a trailing end 72 that is located rearwardly of the leading end 70. The confronting portion 68 is defined by an angle of at least 90° and preferably by an angle of at least 120°. The confronting portion 68 is also characterized by a radius 74 that is centered at a point along the rotary axis 36. The radius 74 is not constant, but rather increases in a smooth manner in the direction in which the blade 28 rotates between a leading end 70 and a trailing end 72. The increasing sweep of the radius 74 therefore provides an increasing amount of clearance between the tip 28a of the blade 28 and the inner surface 68a of the guard 52 between the leading end 70 of the confronting portion 68 and the trailing end 72 of the confronting portion 68. Preferably, the amount of clearance between the leading end 70 and the trailing end 72 increases by a factor of between about 2 to about 10. Those skilled in the art will understand that while the rate by which the radius 74 increases may correspond to any mathematical model, the rate by which the radius 74 increases is dependent upon numerous considerations, including the maximum overall size of the housing assembly 10 and the capability of the blade 28 to circumferentially shed the dirt and debris encountered by the blade 28 during the operation of the edger 8.

In the particular embodiment illustrated, the guard 52 is shown to include a trailing portion 78 that is coupled to the trailing end 72 of the confronting portion 68, extending therefrom in a direction that is generally tangent the radius 74 at the trailing end 72. The trailing portion 78 is configured to maintain an increasing amount of clearance between the guard 52 and the tip, 28a of the blade 28 while permitting the overall size of the housing assembly 10 to be maintained within a predetermined size envelope. In this regard, the trailing portion 78 extends rearwardly by an amount that is relatively smaller than the amount the confronting portion 68 otherwise would have extended had the radius 74 been extended downwardly to the bottom edge of the housing 40.

The extremely smooth configuration of the inner surface 68a of the guard 52 generally, and of the confronting portion 68 in particular, tends to resist the build-up of dirt and debris that is centrifugally directed at the housing assembly 10 by the rotation of the blade 28. As such, the frequency and/or duration of routine cleaning events are reduced as compared with other known edger housing assemblies.

The latch securing structure 54 is illustrated to be integrally formed with a forward portion of the housing 40. The latch securing structure 54 includes a ramp portion 80, a first debris collar 82 and a latch aperture 84. In the example provided, the ramp portion 80 is formed on a helix having an axis that is generally parallel the axis 36. The helix has an inner most point 88 that is positioned on a side of the latch aperture 84 and an outer most point 90 that is rotated in a counterclockwise direction relative to the inner most point 88. The first debris collar 82 surrounds both the ramp portion 80 and the latch aperture 84, extending generally perpendicularly from the forward portion of the first wall member 50. In the particular example provided, the latch aperture 84 is illustrated to have a key-hole shape that includes a cylindrical portion 92 and a slotted portion 94.

Figure 5:
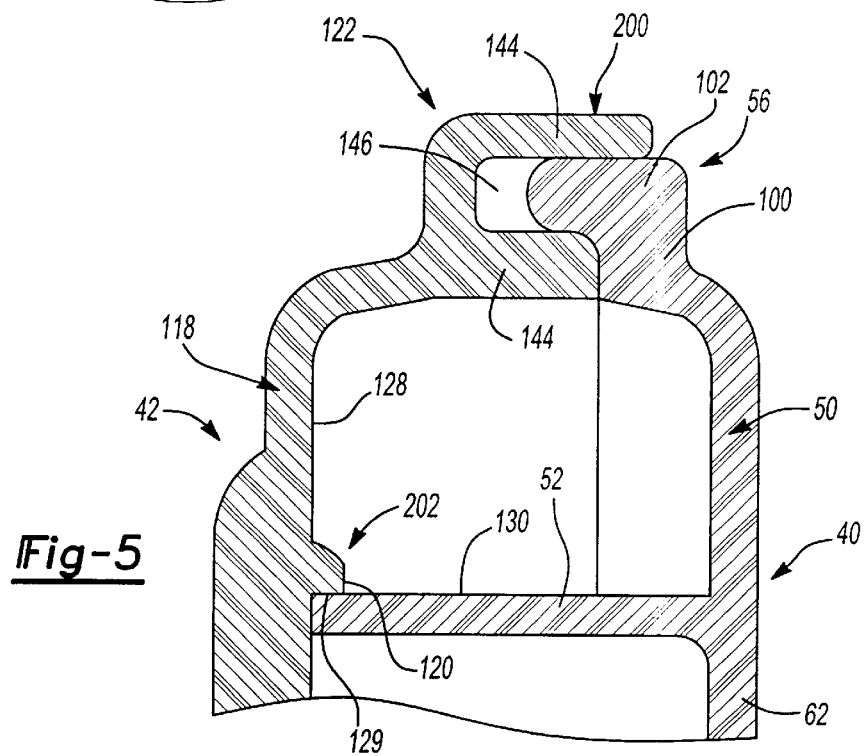
FIG. 5 is a partial sectional view taken along the line 5—5 of FIG. 1.

With reference to FIGS. 3 and 5, the first labyrinth member 56 is a generally L-shaped structure that is coupled to at least a portion of the outer perimeter of the first wall member 50. The first labyrinth member 56 includes a base portion 100, which extends from the first wall member 50, and a leg portion 102 that extends generally perpendicular to the base portion 100. The first labyrinth member 56 is spaced radially outwardly from the guard 52 and in the particular embodiment illustrated, does not extend outwardly from the generally vertical portion 62 of the first wall member 50 to the same extent as the guard 52.

With renewed reference to FIGS. 2 and 3, the first hinge structure 58 is located rearwardly of the guard 52 and includes first and second hinge bosses 110 and 112, respectively. Each of the first and second hinge bosses 110 and 112 extends generally perpendicularly from the generally vertical portion 62 of the first wall member 50. A hinge pin aperture 114 extends completely through the first hinge boss 110 and partially through the second hinge boss 112. The first hinge boss 110 also includes a slotted tab aperture 116 that intersects the hinge pin aperture 114.

Figure 6:
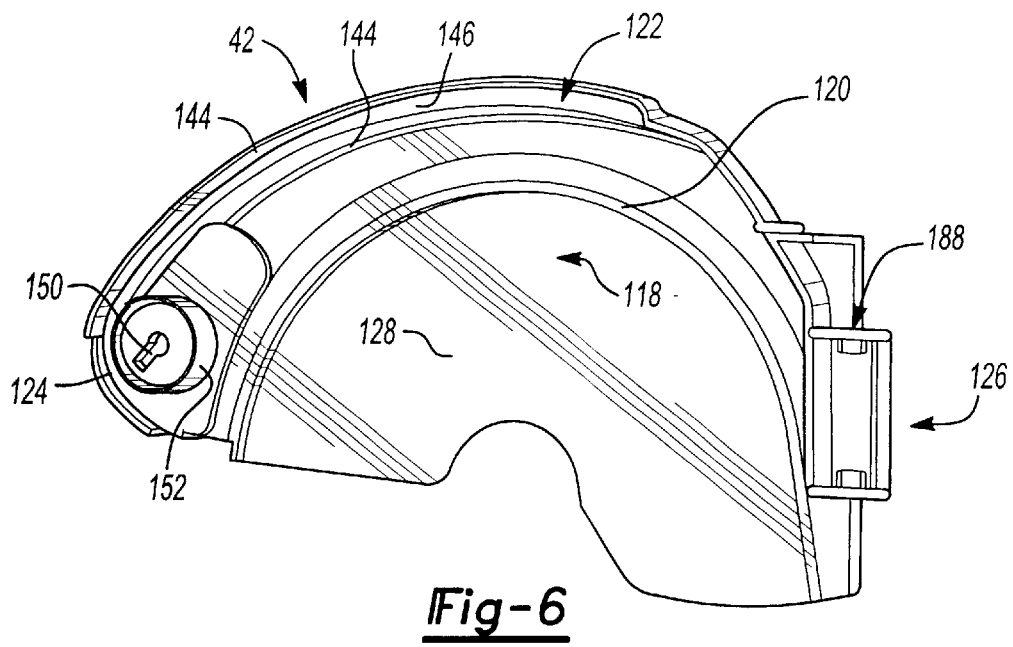
FIG. 6 is a perspective view of a portion of the power edger of FIG. 1 illustrating the door in greater detail.

With reference to FIGS. 2 and 6, the door 42 is illustrated to include a second wall member 118, a guard lip 120, a second labyrinth member 122, a latch housing structure 124 and a second hinge structure 126. The second wall member 118 is sized to cover the open end of the housing 40 and includes a generally vertically extending structure 128 that is configured to abut a side of the blade cavity 60 opposite the first wall member 50. The guard lip 120 is coupled to the generally vertically extending structure 128 and extends generally perpendicularly therefrom. The inner edge 129 of the guard lip 120 is configured to mirror the outer edge 130 of the guard 52 (FIG. 5).

With additional reference to FIG. 5, the second labyrinth member 122 is coupled to at least a portion of an outer edge of the second wall member 118. In the embodiment illustrated, the second labyrinth member 122 is generally U-shaped, having a pair of furcations 144 that extend generally perpendicular the generally vertically extending structure 128 are which are spaced apart from one another to define a void 146 therebetween.

With renewed reference to FIGS. 2 and 6, the latch housing structure 124 is illustrated to be formed into a forward portion of the door 42. An aperture 150, similar in configuration and size to the latch aperture 84 formed in the housing 40, extends through the second wall member 118. A second debris collar 152 extends circumferentially around the aperture 150 on the inner side of the second wall member 118. A collar (not specifically shown) is formed on the outer side of the second wall member 118 radially outwardly of the aperture 150.

Figure 7:
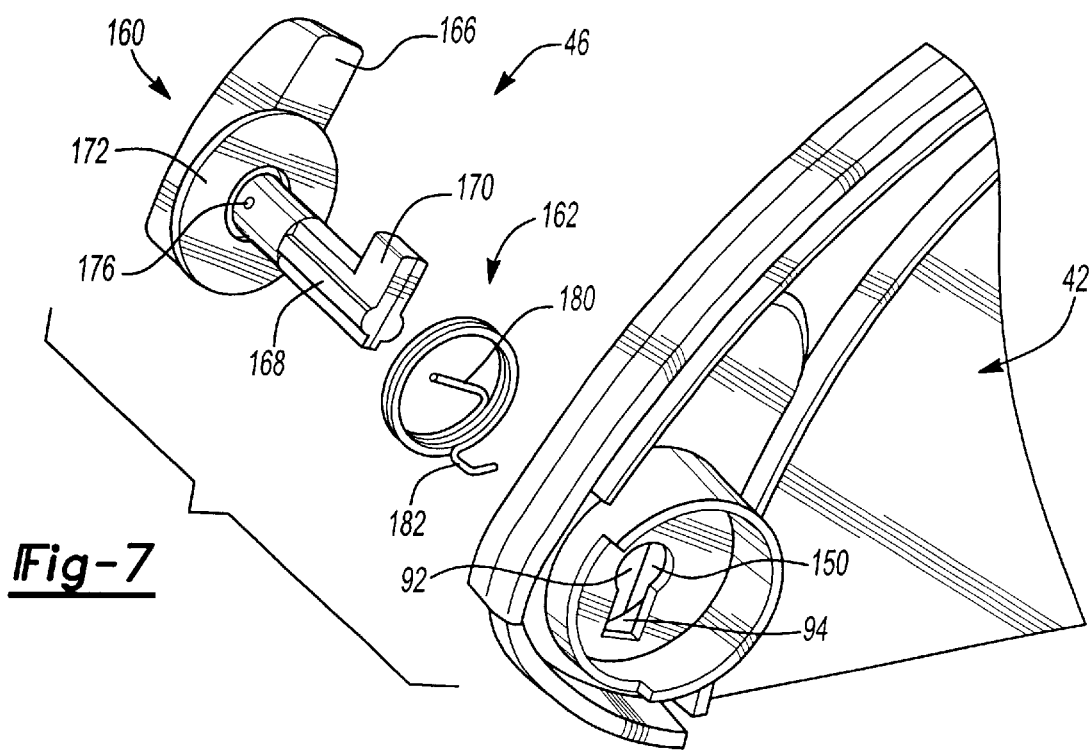
FIG. 7 is an exploded perspective view of a portion of the power edger of FIG. 1 illustrating the latch mechanism in greater detail.

With reference to FIG. 7, the latch mechanism 46 is illustrated to include a knob 160 and a spring 162. In the particular embodiment illustrated, the knob 160 includes a grip portion 166, a spindle 168 and a latch member 170. The grip portion 166 includes a flange member 172 and is configured to receive a rotary input from the thumb and forefinger of the operator of the edger 8. The flange member 172 forms a relatively large surface which supports the loads that are exerted onto the knob 160 by the spring 162 and the operator of the edger 8. The flange member 172 is sized larger than the aperture 150 so as to prevent the knob 160 from being pushed completely through the door 42. The spindle 168 is fixedly coupled to the grip portion 166 at a first end and to the latch member 170 at a second end. In the example provided, the spindle 168 is sized to rotate within the cylindrical portions 92 of the latch aperture 84 and aperture 150 that are formed into the housing 40 and the door 42, respectively. An attachment aperture 176 is formed through the spindle 168 proximate the flange member 172 on an axis that is generally perpendicular to the longitudinal axis of the spindle 168. The latch member 170 extends generally perpendicularly the longitudinal axis of the spindle 168 and is sized to be received through the slotted portion 94 of the latch aperture 84 and aperture 150.

Figure 4:
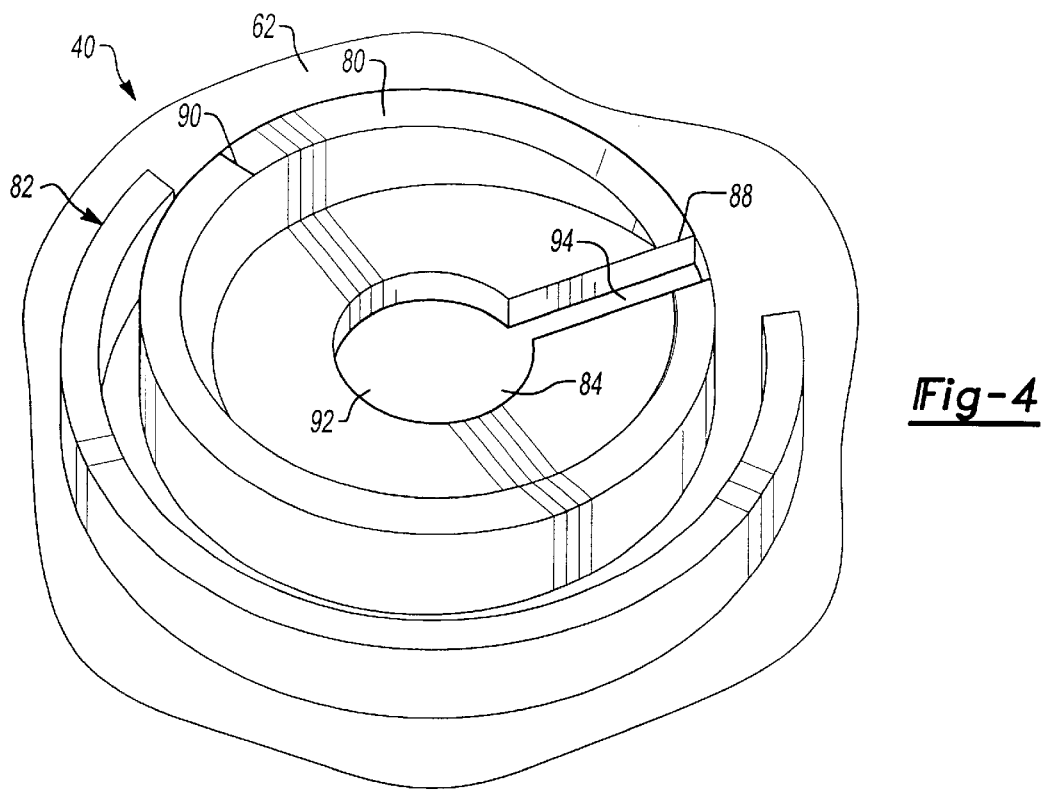
FIG. 4 is an enlarged perspective view of a portion of the housing illustrating the latch securing structure in detail.
Figure 8:
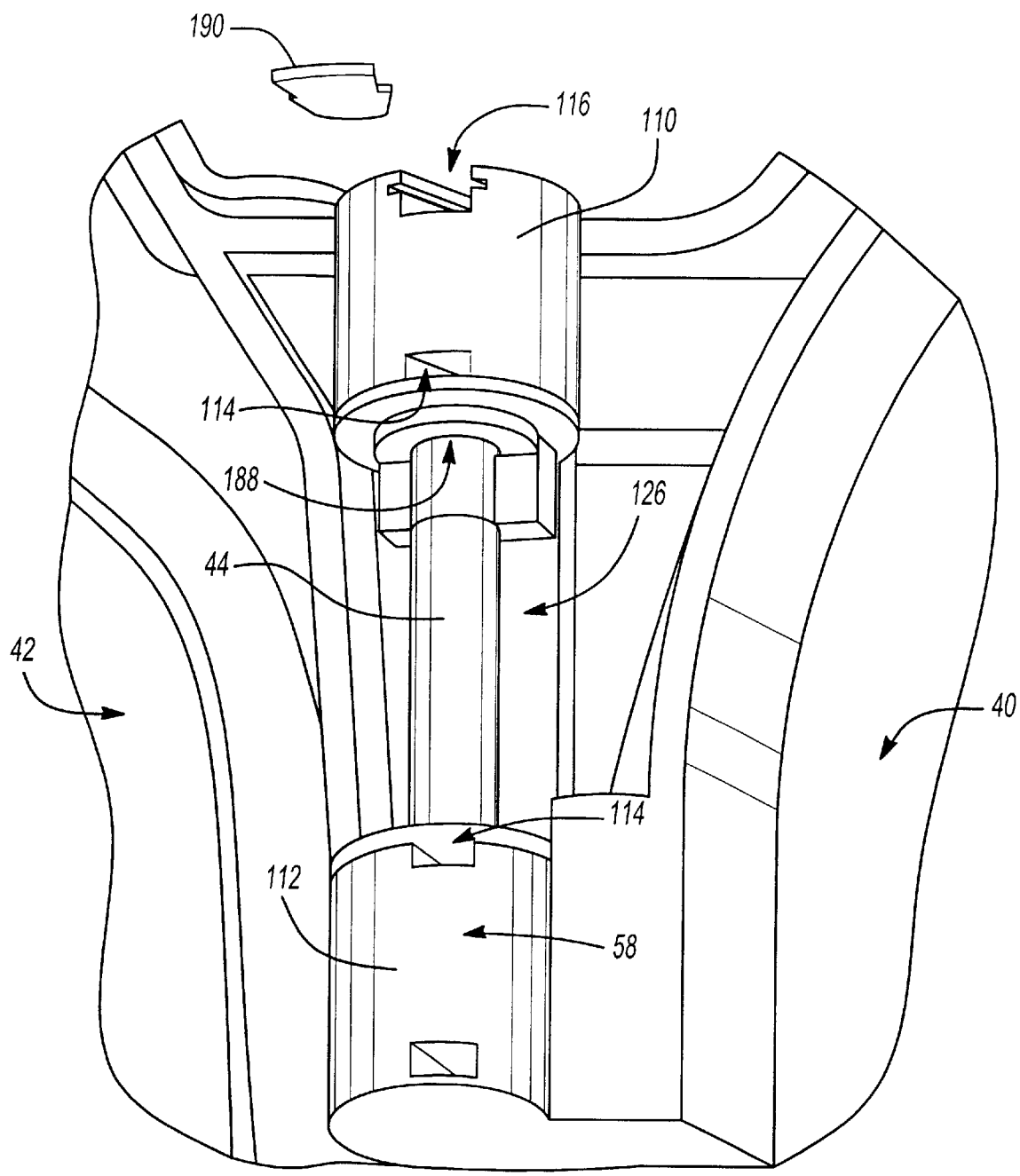
FIG. 8 is a partial exploded perspective view of the power edger of FIG. 1.

The spring 162 is illustrated to be a combination torsion and tension spring having first and second end members 180 and 182, respectively. The first end member 180 is configured to engage a portion of the knob 160, while the second end member 182 is configured to engage the door 42. The spring 162 fits over the collar that is formed on the outer surface of the door 42; the collar serves to position the spring 162 in a radial direction relative to the aperture 150. In the example provided, the first end member 180 is a post that extends through the attachment aperture 176 that is formed through the spindle 168 while the second end member 182 is generally U-shaped, being configured to extend partially through the slotted portion 94 of the aperture 150 and engage the second wall member 118. The torsional aspect of the spring 162 biases the knob 160 in a predetermined rotational direction, which, in the particular embodiment illustrated, is counterclockwise, when looking at the outer surface of the door 42, such that the knob 160 is positioned toward a neutral position as shown in FIG. 1. The tension aspect of the spring 162 generates a biasing force that tends to push the knob 160 inwardly toward the outer surface of the door 42. With renewed reference to FIGS. 2 and 6, the second hinge structure 126 extends outwardly from the second wall member 118, being sized in length to fit between the first and second hinge bosses 110 and 112 on the housing 40. A hinge pin aperture 188 that is sized to receive the generally cylindrically shaped hinge pin 44 extends through the second hinge structure 126. As shown in FIG. 8, the door 42 is coupled to the housing 40 such that the second hinge structure 126 is disposed between the first and second hinge bosses 110 and 112 and the hinge pin 44 is inserted into the hinge pin apertures 114 and 188. A retaining tab 190 is inserted into the slotted tab aperture 116 in the first hinge boss 110 to prevent the hinge pin 44 from becoming dislodged from the hinge pin apertures 114 and 188. Once coupled by the hinge pin 44, the door 42 is pivotally coupled to the housing 40 about an axis that is defined by the hinge pin 44. The door 42 is movable between a closed position, as illustrated in FIG. 1, and an open condition, as illustrated in FIG. 2. With reference to FIGS. 2, 4 and 7, as the door 42 is rotated from the open position to the closed position, the side of the latch member 170 on the knob 160 is brought into contact with the ramp portion 80 that is formed into the latch securing structure 54 of the housing 40. Further rotation of the door 42 about the hinge pin 44 toward the housing 40 causes the latch member 170 to both slide along the ramp portion 80 and rotate in a rotational direction opposite the biasing direction of the spring 162. When the door 42 has been closed sufficiently to align the latch member 170 to the slotted portion 94 of the latch aperture 84, the force applied by the spring 162 causes the latch member 170 and a portion of the spindle 168 to shoot through the latch aperture 84. The knob 160, no longer being constrained by the ramp portion 80, thereafter rotates in the predetermined biasing direction in response to the torsional biasing aspect of the spring 162 to rotate the latch member 170 relative to the slotted portion 94 of the latch aperture 84 so that the latch member 170 is no longer aligned to the slotted portion 94 of the latch aperture 84. From the foregoing, it will be apparent to those skilled in the art that the operator of the edger 8 need not manipulate any portion of the latch mechanism 46 to latch the door 42 to the housing 40. Rather, all that is needed to actuate the latch mechanism 46 to latch the door 42 to the housing 40 is to rotate the door 42 and the housing 40 together.

With reference to FIG. 5, when the door 42 is placed in a closed position, the guard lip 120 is illustrated to engage the outer perimeter of the guard 52 and the leg portion 102 of the first labyrinth member 56 is shown to engage the void 146 between the furcations 144 of the second labyrinth member 122. As thus configured, the first and second labyrinth members 56 and 122 cooperate when the door 42 is in the closed position to form a labyrinth seal 200 around at least a portion of the housing assembly 10 that inhibits dust and debris from exiting the housing assembly 10. Further, the guard lip 120 and guard 52 cooperate to form a secondary seal 202 that is located radially inwardly of the labyrinth seal 200. The secondary seal 202 additionally assists in inhibiting the transmission of dust and debris outwardly of the housing assembly 10. The secondary seal 202 also tends to inhibit the transmission of dust and debris to other portions of the housing assembly 10, such as the first and second hinge structures 58 and 126 and the latch mechanism 46.

With reference to FIGS. 4 and 7, when the door 42 is positioned in the closed position, the first and second debris collars 82 and 152 engage or nest to form a supplemental debris guard (not specifically shown) around the latch mechanism 46. The supplemental debris guard tends to inhibit the transmission of any dirt and debris that are expelled past the secondary seal 202 into the latch mechanism 46.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A power edger comprising:
   a power source for providing a rotational output;
   a blade device coupled to the power source and rotating about a rotary axis in a rotational direction in response to the rotational output of the power source;
   a housing assembly defining a blade cavity in which the blade device is rotatably mounted, the housing assembly including a guard that is configured to shroud the blade device, the guard having a confronting portion that at least partially surrounds the blade device as it rotates in the blade cavity, the confronting portion being defined by a radius that increases in the rotational direction from a first radius at a leading end of the confronting portion to a second, larger radius at a trailing end of the confronting portion, the radius increasing smoothly from the leading end to the trailing end.

2. The power edger of claim 1, herein a magnitude of the radius at each point on the confronting portion is directly related to an angular dimension between the point and the leading end.

3. The power edger of claim 2, wherein the radius increases from the leading end to the trailing end in a constant manner.

4. The power edger of claim 1, wherein the guard includes a trailing portion that is coupled to the confronting portion, the trailing portion being fixed to the trailing end and extending away from the confronting portion, the trailing portion being disposed generally tangent the radius at the trailing end.

5. The power edger of claim 1, wherein the radius has a center point that is disposed along the rotary axis.

6. The power edger of claim 1, wherein the confronting portion extends around the blade cavity in a direction generally parallel to the rotary axis.

7. The power edger of claim 1, wherein the housing assembly includes a housing and a door, the door being coupled to the housing and movable between an open position, wherein the door substantially clears the blade cavity, and a closed position, wherein the door substantially closes at least a portion of the blade cavity, the guard being fixedly coupled to the housing.

8. The power edger of claim 7, wherein the housing and the guard are unitarily formed.

9. A power edger comprising:
   a power source for providing a rotational output;
   a blade device coupled to the power source and rotating in response to the rotational output;
   a housing assembly configured to shroud the blade device, the housing assembly including a housing and a door, the housing being coupled to the power source, the housing having a wall member and a first labyrinth member, the wall member defining a blade cavity in which the blade device is rotatably mounted, the first labyrinth member being coupled to the wall member and extending around at least a portion of the blade cavity, the door having a wall member and a second labyrinth member, the door being mounted to the housing and movable between an open position, which substantially clears the blade cavity, and a closed position, which closes a portion of the blade cavity;
   wherein the first and second labyrinth members engage one another to form a labyrinth seal when the door is placed in the closed position.

10. The power edger of claim 9, wherein a hinge pivotally couples the door to the housing.

11. The power edger of claim 10, wherein one of the first and second labyrinth members includes a pair of furcations that extend in a direction generally perpendicular to a rotary axis of the hinge.

12. The power edger of claim 11, wherein the other one of the first and second labyrinth members includes a seal member that extends between the pair of furcations when the door is in the closed position.

13. The power edger of claim 9, further comprising a guard that is coupled to one of the housing and the door, the guard being disposed between the blade and the labyrinth seal.

14. The power edger of claims 13, further comprising a guard lip coupled to the other one of the housing and the door, the guard lip engaging the guard when the door is in the closed position to form a second labyrinth seal.

15. The power edger of claim 14, wherein the guard and the guard lip extend in a direction generally perpendicular to an axis about which the blade device rotates.

16. The power edger of claim 14, further comprising a latch mechanism for releasably securing the door in the closed position, the latch mechanism being disposed between the labyrinth seal and the second labyrinth seal when the door is in the closed position.

17. The power edger of claim 9, wherein the first labyrinth member is formed about at least a portion of the perimeter of the housing.

18. A power edger comprising a power source for providing a rotational output, a blade device coupled to the power source and rotating about a rotary axis in a rotational direction in response to the rotational output of the power source, and a housing assembly configured to shroud the blade device, the housing assembly including a housing and a door, the housing being coupled to the power source and having a wall member, a first labyrinth member, and a guard, the wall member defining a blade cavity in which the blade device is rotatably mounted, the guard being coupled to the wall member and having a confronting portion that at least partially surrounds the blade device as it rotates in the blade cavity, the confronting portion being defined by a radius that increases smoothly in the rotational direction from a first radius at a leading end of the confronting portion to a second, larger radius at a trailing end of the confronting portion, the first labyrinth member being coupled to the wall member and being disposed radially outwardly from the guard such that it extends around at least a portion of the blade cavity, the door being mounted to the housing and movable between an open position, which substantially clears the blade cavity, and a closed position, which closes a portion of the blade cavity, the door having a second labyrinth member that is configured to engage the first labyrinth member to form a labyrinth seal when the door is placed in the closed position.

* * * * *

UNITED STATES PATENT AND TRADEMARK OFFICE
CERTIFICATE OF CORRECTION

PATENT NO. : 6,612,376 B2
DATED : September 2, 2003
INVENTOR(S) : Oleksiy P. Sergyeyenko et al.

It is certified that error appears in the above-identified patent and that said Letters Patent is hereby corrected as shown below:

<u>Title page, Item [54] and Column 1, line 1,</u>
Title, after "HOUSING" insert -- HAVING --.

<u>Column 8,</u>
Line 7, "claims" should be -- claim --.

Signed and Sealed this

Thirtieth Day of December, 2003

JAMES E. ROGAN
*Director of the United States Patent and Trademark Office*